US006766997B2

(12) United States Patent
Stewart, III

(10) Patent No.: US 6,766,997 B2
(45) Date of Patent: Jul. 27, 2004

(54) HANGER/HOOK/STORAGE ATTACHMENT DEVICE

(76) Inventor: Kenneth G. Stewart, III, 6938 Stetson Street Cir., Sarasota, FL (US) 34243

( * ) Notice: Subject to any disclaimer, the term of this patent is extended or adjusted under 35 U.S.C. 154(b) by 0 days.

(21) Appl. No.: 10/244,552

(22) Filed: Sep. 17, 2002

(65) Prior Publication Data
US 2004/0051025 A1 Mar. 18, 2004

(51) Int. Cl.[7] .............................................. F16B 45/04
(52) U.S. Cl. ...................... 248/690; 248/307; 248/339; 224/551; 298/3; 403/213; 280/47.31
(58) Field of Search ................ 16/405, 429; 280/47.31; 298/3; 248/682, 683, 690, 691, 692, 339, 307, 295.11, 298.1, 279.1, 287.1, 285.1, 286.1; 403/213; 224/497, 549, 551, 269, 270, 271, 280

(56) References Cited

U.S. PATENT DOCUMENTS

| 468,639 | A | * | 2/1892 | Bryant ..................... 248/685 |
| 828,519 | A | * | 8/1906 | Seng ......................... 16/429 |
| 939,508 | A | * | 11/1909 | Hull ......................... 248/95 |
| 1,435,744 | A | * | 11/1922 | Santaniello ................ 15/265 |
| 1,486,566 | A | * | 3/1924 | Crecelius ................... 248/692 |
| 1,713,077 | A | * | 5/1929 | Frizl ......................... 248/691 |
| 1,763,798 | A | * | 6/1930 | Mann ......................... 248/691 |
| 1,778,075 | A | * | 10/1930 | Frances ...................... 211/153 |
| 2,088,812 | A | * | 8/1937 | Reichenbach .............. 248/682 |
| 2,427,004 | A | * | 9/1947 | Kampf ....................... 220/763 |
| 2,429,797 | A | * | 10/1947 | Bovenzi ..................... 280/47.2 |
| 2,538,778 | A | * | 1/1951 | Halpin ....................... 119/497 |
| 2,553,334 | A | * | 5/1951 | Schmidt .................... 280/47.31 |
| 2,646,911 | A | * | 7/1953 | Holmberg .................. 206/159 |
| 3,239,182 | A | * | 3/1966 | Blanz ........................ 248/682 |
| 3,647,604 | A | * | 3/1972 | Schoenherr et al. ....... 248/27.8 |
| 3,660,861 | A | * | 5/1972 | Delmonico ................ 15/209.1 |
| 3,915,308 | A | | 10/1975 | Ratzloff et al. .............. 211/88 |
| 3,995,803 | A | * | 12/1976 | Uitz ........................... 224/432 |
| 4,209,157 | A | * | 6/1980 | Edmisten ................... 248/691 |
| 4,467,925 | A | | 8/1984 | Ratzloff et al. .......... 211/60 T |
| 4,519,566 | A | * | 5/1985 | Manzi ........................ 248/682 |
| 4,628,893 | A | * | 12/1986 | Shaw, III .................... 124/23.1 |
| 4,632,242 | A | * | 12/1986 | Choi et al. ................ 206/45.24 |
| 4,693,381 | A | * | 9/1987 | Lodge ..................... 211/94.01 |
| 4,727,620 | A | * | 3/1988 | Gummelt ..................... 16/429 |
| 5,236,111 | A | | 8/1993 | Ferguson ............ 224/42.045 R |
| 5,607,174 | A | * | 3/1997 | Ambrogio ................... 280/653 |
| 5,685,512 | A | * | 11/1997 | Yang ....................... 248/298.1 |
| 5,755,414 | A | | 5/1998 | Remmers ................... 248/201 |
| 5,762,210 | A | | 6/1998 | Dahill ........................ 211/60.1 |
| D447,848 | S | | 9/2001 | Laga et al. ................. D34/27 |
| 6,609,693 | B2 | * | 8/2003 | Hui ............................ 248/489 |

FOREIGN PATENT DOCUMENTS

FR          862757      *  3/1941    ................ 248/690

* cited by examiner

Primary Examiner—Leslie A. Braun
Assistant Examiner—Jon Szumny
(74) Attorney, Agent, or Firm—Barnes & Thornburg

(57) ABSTRACT

A device for hanging implements comprising a hook member having two straight parallel arms with the first end of each arm joined by an arcuate section and with the opposite end of each arm extending at an angle with respect to its respective arm, and a generally flat base member for joining the hook to the implement.

10 Claims, 3 Drawing Sheets

HANGER/HOOK/STORAGE ATTACHMENT DEVICE

BACKGROUND OF THE INVENTION

1. Field of the Invention

The invention relates to a support for storing implements. More particularly, the invention relates to a support for storing a wheelbarrow. The support includes the shape of a hook which can function as a hanger or as a support. The support is also useful for hanging or supporting other implements and provides a simple, inexpensive attachment for storing items of a wide range of sizes in an orderly manner.

2. Description of the Related Technology

U.S. Pat. No. D447,848 discloses a wheelbarrow holder comprising upper and lower members attached to a wall whereby the wheelbarrow is held to the wall by the upper and lower members.

U.S. Pat. No. 3,915,308 discloses a rack for storing a wheelbarrow. The rack is mounted on a wall and the wheelbarrow is stored by placing it onto the rack.

U.S. Pat. No. 5,755,414 discloses a hanger assembly for suspending a wheelbarrow along a wall. The assembly includes a hook mounted on the wall at a height from the floor at which it will engage a lip on the wheelbarrow bed without the lip's being lifted manually and will support the wheelbarrow above the floor when the wheelbarrow is tilted around he hook as a fulcrum toward the wall.

U.S. Pat. No. 4,467,925 discloses a rack for placement on a wall surface for the suspended storage of garden tools and a wheelbarrow. A horizontal rack member slidably receives multiple brackets on which the heads of the stored tools may rest. Sleeves having wire bails are also slidably mounted on the horizontal rack member and receive the handles of a wheelbarrow. A vertical rack member is coupled to the first mentioned rack member and is provided with a wheelbarrow support in a manner offsetting the wheelbarrow from the wall permitting tools to be stored between the wheelbarrow and the supporting wall surface.

U.S. Pat. No. 5,762,210 discloses a storage rack for a wheelbarrow and includes a lower hook attached to a wall, the hook being configured to receive a portion of a forward lip of the wheelbarrow pan therein. A bar assembly is mounted above the hook and includes a U-shaped bar swingable between a first position with the bar adjacent the wall and a second position displaced from the wall.

U.S. Pat. No. 5,236,111 discloses a wheelbarrow storage rack for storing and securing a wheelbarrow on a vehicle, the storage rack is comprised of a frame generally dimensioned to the size of the tray of the wheelbarrow, the frame having channel members positioned on the side members and at least one cross member for cooperative, slidable engagement with the tray edge of the tray of the wheelbarrow.

SUMMARY OF THE INVENTION

The invention is directed to an attachment having a portion for engaging a hook and supporting a wheelbarrow or other device in a stored position. The attachment enabling a wheelbarrow to be hung or to stand upright on its own.

Wheelbarrows are of a size and shape so as to limit the options for their storage. Most often they are stored on the floor or next to a wall in an out of the way location. The present invention when used in conjunction with a wheelbarrow facilitates storage in a convenient manner. Lawn carts, wagons, lawn barrows and other similar devices are also conveniently stored with the use of the attachment of the present invention.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
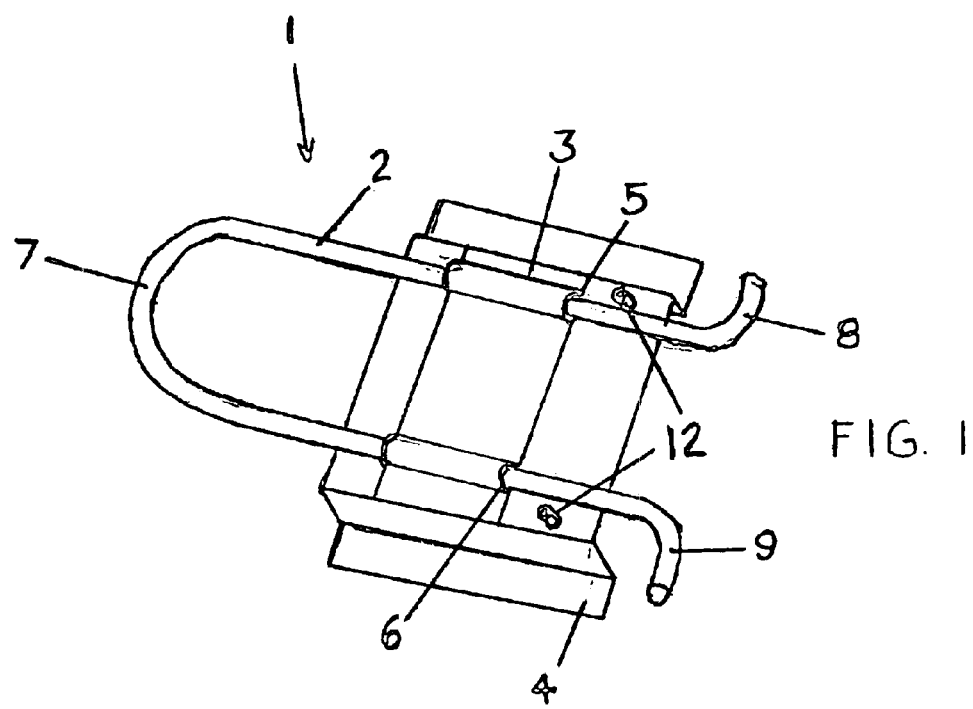
FIG. 1 shows a perspective view of one embodiment according to the invention.
Figure 4:
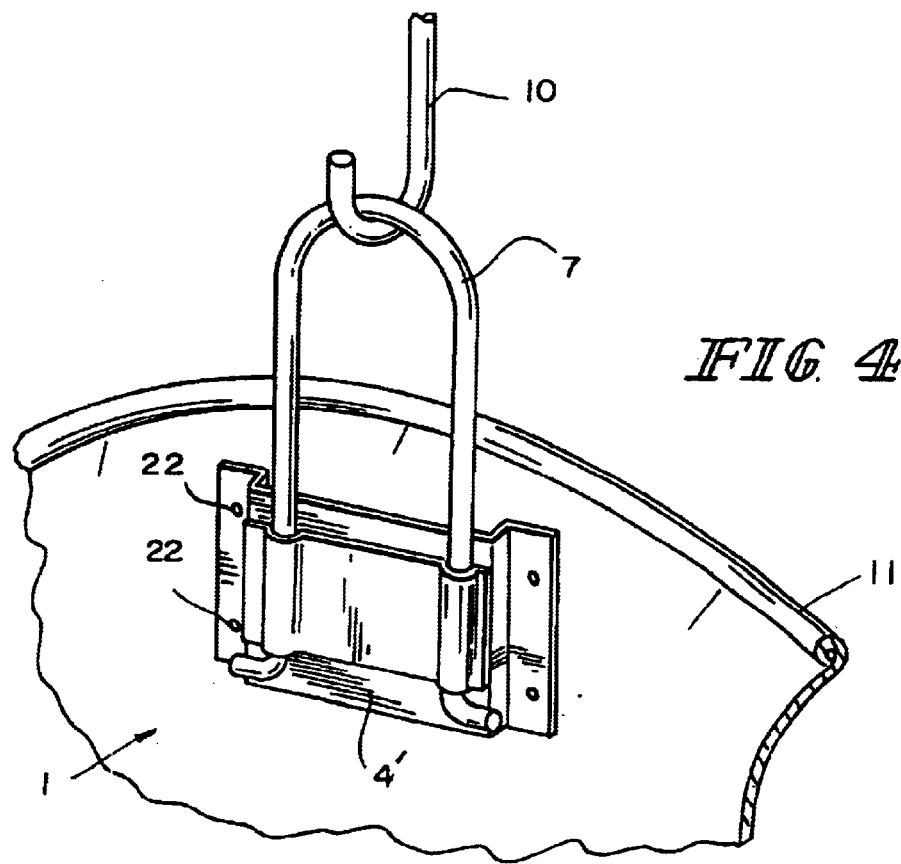
FIG. 4 shows the attachment used for hanging a wheelbarrow from a hook.

The embodiment shown in FIG. 1 shows hanger hook 1 having a U-shaped member 2 which is affixed to a base bracket 4 via connector 3. Member 2 has two arm portions extending in a parallel direction and joined by a spanning portion 7 (shown as arcuate) at one end of the two arm portions. The other ends 8 and 9 of the arm portions extend at an angle to the parallel direction to form a J-shape. The connector 3 may be formed monolithically with the base bracket 4 or formed separately and joined as by welding, adhesive bonding, bolting or other similar means. The connector 3 has channels 5, 6 which accommodate the U-shaped member 2 so that the U-shaped member 2 can slide in a direction along the axis of the two arm portions for a fixed distance in either axial direction. Sliding of the U-shaped member 2 in one axial direction extends the spanning portion 7 of the U until the opposite J-shaped ends 8, 9 engage the ends of the channels 5, 6 and prevent further axial movement in that direction (FIG. 4). In this position spanning portion 7 is extended and can engage a hook 10 on a pegboard or other structure to permit the attachment of an attached implement, e.g. a wheelbarrow, to be hung from a wall hook 10 as shown in FIG. 4 wherein the hanger hook 1 is affixed to the tub portion of a wheelbarrow with the spanning portion extending past the lip 11 of the wheelbarrow pan a sufficient distance so that it can be engaged by wall hook 10 to secure the wheelbarrow to be stored. When the wheelbarrow is in use the U-shaped member 2 tends (by gravity) to move axially in the opposite direction so that the spanning portion is retracted out of the way below the lip 11 of the wheelbarrow. Although the spanning portion 7 is depicted as U-shaped, it may be V-shaped or other similar shape.

As seen in FIG. 1, the base bracket 4 may be provided with a bump protuberance 12 over which the J-shaped ends 8, 9 snap past. The snap action will hold the J-shaped members in an extended position. One or two protuberances 12 can be used.

Figure 2:
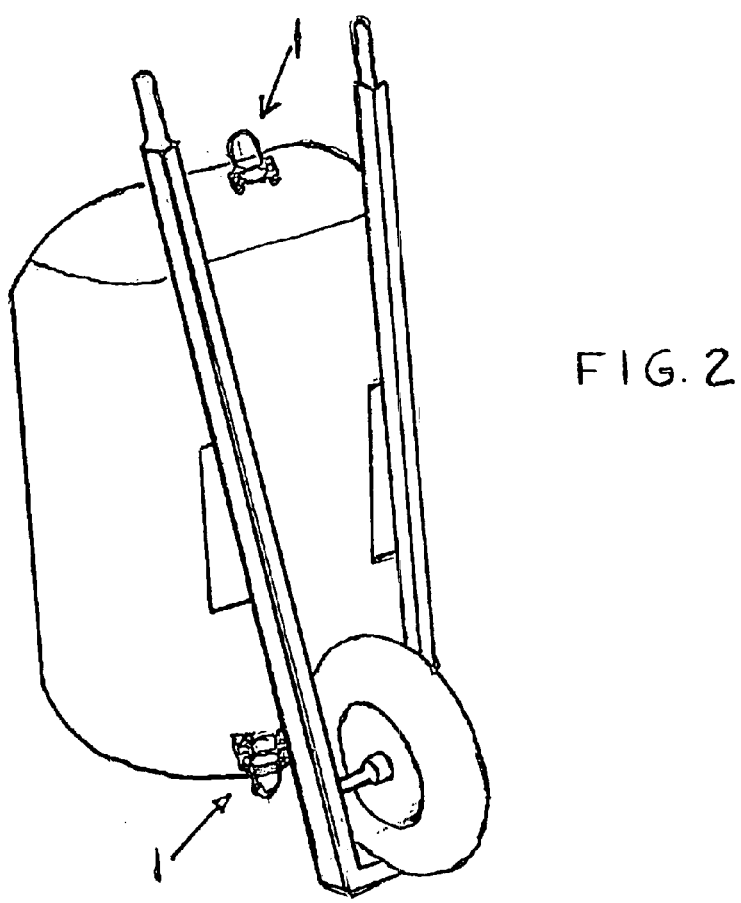
FIG. 2 shows a perspective view of a wheelbarrow having attachments according to the invention affixed to different locations on the bed or pan of the wheelbarrow.

In FIG. 2 the hanger hook 1 is shown attached to a wheelbarrow in more than one location. If the top shown support is used with the hanger hook 1 of FIG. 4 the wheelbarrow is stored wheel down and if the bottom shown support is used with the hanger hook 1, the wheelbarrow is stored with the wheel up. If a base bracket 4 has a strong magnet it can be manually attached to the wheelbarrow tub at either end or at an intermediate location. FIG. 2 shows a hanger hook 1 attached near the lip 11 of the wheelbarrow and another hanger hook 1 fixed to the lower end of the wheelbarrow pan. When fixed to the lower end of the wheelbarrow pan the spanning portion 7 can function as a support to hold the wheelbarrow in an upright position standing on its own. When used in this manner the U-shaped member 2 must be capable of being fixed so that it remains in the extended position. This is evident from FIG. 2 wherein the lower hanger hook 1 has U-shaped member 2 that is not slidable, rather it is releasably fixed in the extended position so as to provide, in conjunction with the ends of the two handles, a three point stand. This stance permits the wheelbarrow to be stored on its own without the need for a wall hook. This permits the wheelbarrow to be stored in a variety of locations, not always in the same location or where there is a wall, or other type, hook. The bump protuberances 12 could also be effective to hold the U-shaped member 2 in an extended position.

Figure 3:
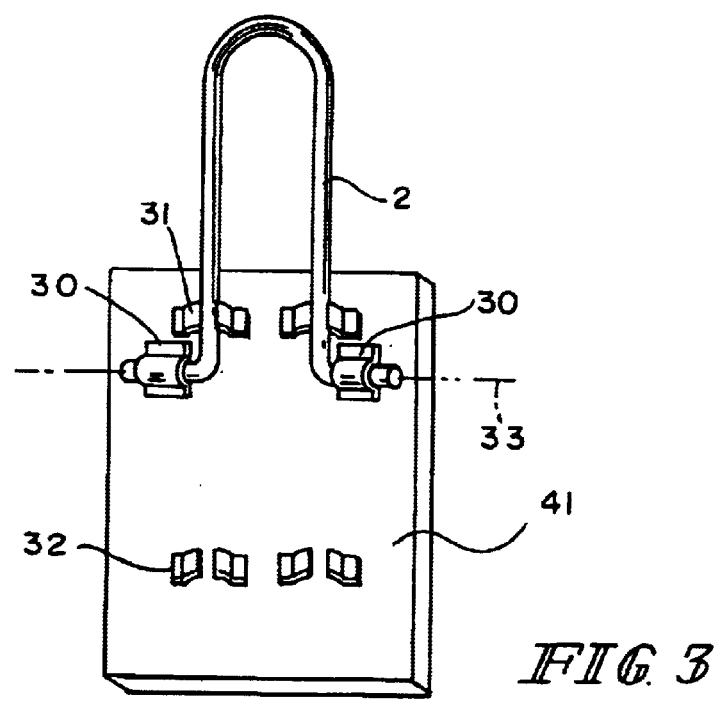
FIG. 3 shows a second embodiment of the attachment according to the invention.

FIG. 3 shows one manner of providing the U-shaped member in a fixed orientation. As shown in FIG. 3 the U-shaped member 2 is pivotably supported, rather than slidably supported. In this arrangement the end legs of the U-shaped member 2 are substantially straight and are held by brackets 30 so that they pivot about the axis 33. Brackets 30 hold the U-shaped member 2 to fixture 41 which is joined to the wheelbarrow or other implement by fastening means (not shown) such as screws, bolts, adhesives, magnets or other similar means. For example, FIG. 4 shows holes 22 on edges of the base bracket 41 for receiving screws or bolts. These edges could be magnetic, or magnets could be placed under the edges (if the bracket is iron) or attached to the bracket (if it is not iron). A magnetic attachment allows for quick attachment and use of the hangar on many different tools or items. To retain the hanger hook in the extended position shown for either hanging the implement or supporting the implement, like a wheelbarrow, in a standing position, a set of clasps 31 can be provided. The clasps 31 are C-shaped with the opening being slightly smaller than the diameter of the U-shaped member 2 so that they provide an interference fit to hold the U-shaped member in the extended position shown. Clasps 31 may be made of rubber, aluminum or other similar material which will flex slightly to permit the U-shaped member to pass between the ends of the C yet retain it when it is held by the clasps 31. A second set of clasps 32 is provided as shown for holding the U-shaped member in a stored, or retracted out of the way, position. The U-shaped member is pivoted about axis 33 away from the extended position of clasps 31 (as shown in FIG. 3) into engagement with the clasps 32 for retaining the U-shaped member 2 in a retracted or stored position.

Figure 5:
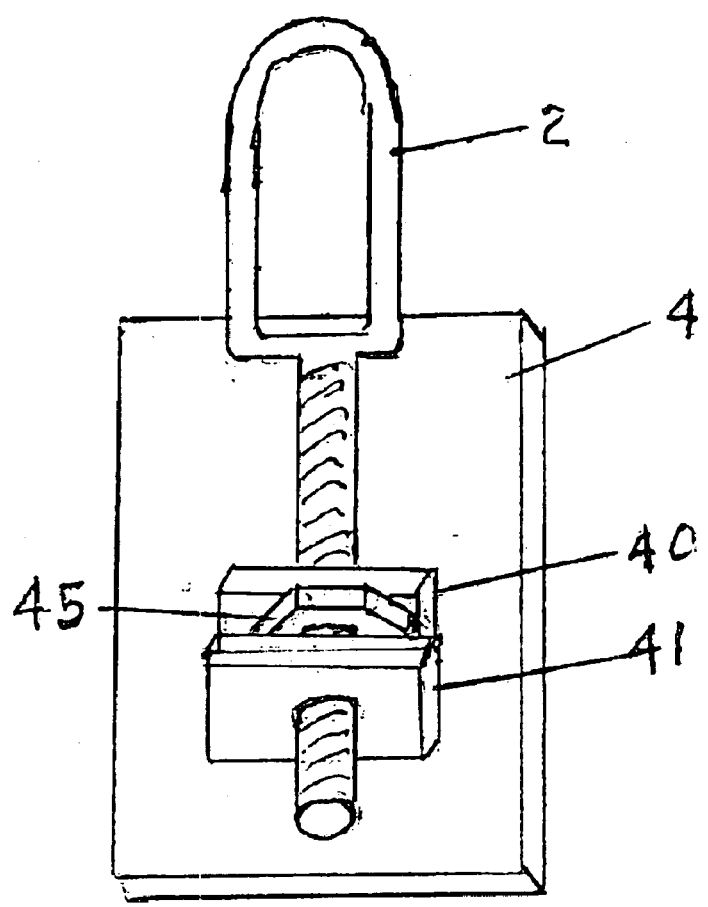
FIG. 5 shows a third embodiment of the attachment according to the invention.

FIG. 5 shows yet another embodiment wherein the U-shaped member has the legs joined at one end in a single threaded rod that is held to bracket 4 via two plates 40, 41 and a nut 45. The plates 40, 41 are joined to the bracket 4 by welding or other bonding or being formed monolithically with the bracket 4. The rod is held by and extends through holes in the plates 40, 41. When the nut is turned the rod moves axially and extends or retracts the U-shaped member. The thread characteristics, e.g., pitch, etc. are selected to enable easy turning of the nut to permit adjustment as desired but with sufficient resistance to enable the implement to be hung or supported as shown in FIG. 2 without turning of the nut.

As previously indicated, many different types of attachment schemes can be used to attach the bracket 4 to the item to be supported. Where adhesives are utilized, they can be protected by a peel strip, which is peeled off to expose an adhesive surface to attach the bracket 4 to the item to be supported. Likewise, one could use a hook and loop-type fastener (e.g., VELCRO) for attaching the bracket 4.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An attachment for facilitating storage of an implement comprising,
   a member having two arms extending in a generally parallel direction with a first end of each arm joined by a spanning section and with the opposite end of each arm forming a bent portion at an angle with respect to the generally parallel direction,
   a base having a first portion for retaining the joined arms on the base and for slidable movement of the member along the length of the arms, with respect to the base, between a storage position and a position for supporting the implement,
   the base having a second portion adapted for joining to an implement, and
   at least one protuberance on the exterior of the base first portion cooperating with at least one of the bent portions to hold the member in an extended position for supporting the implement.

2. The device of claim 1 wherein the member is generally U-shaped with the first end of each arm being joined by the spanning section to form a generally U-shaped connection.

3. The device of claim 2 wherein the opposite end of each arm is substantially perpendicular to the generally parallel direction of each arm.

4. The device of claim 2 wherein the base includes two parallel cylindrical portions, each portion adapted for slidably receiving one of the parallel arms to enable the member to move to and from its operative position for hanging the implement to its storage position whereby the member is not interfering with the operation of the implement, and
   wherein each opposite end of each arm extending at an angle is adapted to prevent the member from being removed from the base when the member is in its operative position.

5. The device of claim 1 wherein the spanning section is generally V-shaped.

6. An attachment for facilitating storage of an implement comprising,
   a member having two arms extending in a generally parallel direction with a first end of each arm joined by a spanning section and with the opposite end of each arm forming a bent portion at an anile with respect to the generally parallel direction,
   a base having a first portion for retaining the joined arms on the base and for slidable movement of the member alone the length of the arms, with respect to the base, between a storage position and a position for supporting the implement,
   the base having a second portion adapted for joining to an implement,
   the base being generally flat and having holes for connectors which can secure the base to the implement, and at least one protuberance on the base portion engaging with at least one of the bent portions to hold the member in an extended position for supporting the implement.

7. A combination of an attachment for facilitating storage of an wheelbarrow and a wheelbarrow comprising, a member having two arms extending in a generally parallel direction with a first end of each arm joined by a spanning section and with the opposite end of each arm bent at an angle with respect to the generally parallel direction, a base having a first portion for retaining the joined arms on the base and for slidable movement of the member, with respect to the base, between a storage position and a position for supporting the implement, the base having a second portion adapted for joining to an wheelbarrow, and a wheelbarrow, wherein the attachment is secured to the wheelbarrow tub at a location enabling the attachment with the secured wheelbarrow to be hung.

8. A combination of an attachment for facilitating storage of an wheelbarrow and a wheelbarrow comprising, a member having two arms extending in a generally parallel direction with a first end of each arm joined by a spanning section and with the opposite end of each arm bent at an angle with respect to the generally parallel direction, a base having a first portion for retaining the joined arms on the base and for slidable movement of the member, with respect to the base, between a storage position and a position for supporting the implement, the base having a second portion adapted for joining to an wheelbarrow, and a wheelbarrow, wherein the attachment being is secured to the wheelbarrow tub at a location enabling the attachment with the secured wheelbarrow to hold the wheelbarrow in an upright position standing on its own.

9. An attachment for facilitating storage of an implement comprising, a member having two arms extending in a generally parallel direction with a first end of each arm joined by a spanning section and with the opposite end of each arm forming a bent portion at an angle with respect to the generally parallel direction, a base having a first portion for retaining the joined arms on the base and for slidable movement of the member along the length of the arms, with respect to the base, between a storage position and a position for supporting the implement, the base having a second portion adapted for joining to an implement, wherein the second portion comprises one of a screw, a bolt, a magnet, an adhesive or a hook and loop-type fastener for securing the base to the implement, and at least one protuberance on the base portion engaging with at least one of the bent portions to hold the member in an extended position for supporting the implement.

10. An attachment for facilitating storage of an implement comprising, a member having two arms extending in a generally parallel direction with a first end of each arm joined by a spanning section and with the opposite end of each arm forming a bent portion at an angle with respect to the generally parallel direction, a base having a first portion for retaining the joined arms on the base and for slidable movement of the member alone the length of the arms, with respect to the base, between a storage position and a position for supporting the implement, the base having a second portion adapted for joining to an implement, and a mechanism to hold the member in an extended position for supporting the implement wherein the mechanism comprises protuberances that are provided on the base to retain the member in an operative position and that engage with at least one of the bent portions.

* * * * *

UNITED STATES PATENT AND TRADEMARK OFFICE
CERTIFICATE OF CORRECTION

PATENT NO. : 6,766,997 B2
APPLICATION NO. : 10/244552
DATED : July 27, 2004
INVENTOR(S) : Kenneth G. Stewart, III Page 1 of 1

It is certified that error appears in the above-identified patent and that said Letters Patent is hereby corrected as shown below:

In Claim 6,     Col. 4 line 56, delete "anile" and insert --angle--; and
                   Col. 4 line 60, delete "alone" and insert --along--.

In Claim 7,     Col. 5 line 6, delete "an" and insert --a--.

In Claim 8,     Col. 5 line 23, delete "an" and insert --a--; and
                   Col. 5 line 36, delete "being".

In Claim 10,    Col. 6 line 30, delete "alone" and insert --along--.

Signed and Sealed this

Ninth Day of October, 2007

JON W. DUDAS
*Director of the United States Patent and Trademark Office*